Oct. 27, 1964  J. PIGEROULET ETAL  3,153,900
DRIVING UNITS FOR AUTOMOTIVE VEHICLES AND THE LIKE
Filed May 27, 1963
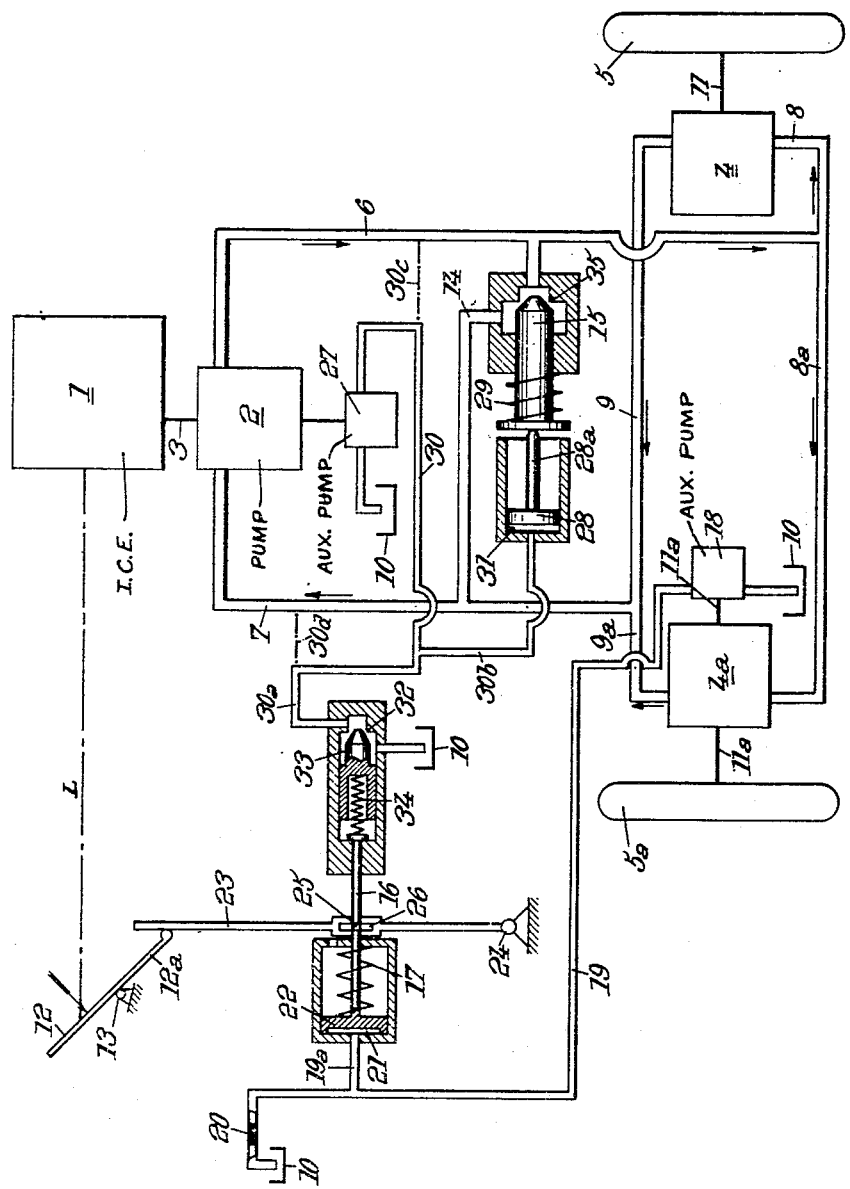
INVENTORS
JEAN PIGEROULET AND
FRANÇOIS DUMAS
BY Bailey, Stephens &
Huettig
ATTORNEYS United States Patent Office 3,153,900
Patented Oct. 27, 1964

3,153,900
DRIVING UNITS FOR AUTOMOTIVE VEHICLES
AND THE LIKE
Jean Pigeroulet, Lyon, and François Dumas, Villeurbanne, Rhone, France, assignors to Societe Industrielle Generale de Mecanique Appliquee S.I.G.M.A., Paris, France
Filed May 27, 1963, Ser. No. 283,502
14 Claims. (Cl. 60—19)

This invention relates to driving units of the kind formed of a thermal engine, such as an internal combustion engine, and of a hydraulic power transmission comprising a hydraulic generator or pump driven by the thermal engine, at least one hydraulic motor mechanically coupled with the member to be driven, a hydraulic fluid delivery line, and a hydraulic fluid return line, the said delivery and return lines forming a closed circuit between the hydraulic generator or pump and the hydraulic motor or motors. The invention is more particularly, but not exclusively, concerned with driving units of the kind above referred to which are used on automotive vehicles, the member to be driven being a wheel or a set of wheels thereof.

A hydraulic power transmission of the kind above referred to may be so arranged as to provide a variable speed ratio between the hydraulic generator or pump and the hydraulic motor or motors, but in any case it forms a rigid connection between the engine and the wheels. It is an object of the present invention to provide means whereby this connection is automatically released when the vehicle is at standstill, and is progressively re-established when the engine is accelerated in order to start the vehicle, or when the speed of the vehicle increases above a given limit, as for instance in a declivity, so that the engine may operate as a brake.

In accordance with the present invention there is provided a discharge conduit between the delivery line and the return line or the hydraulic fluid reservoir of the transmission, there is inserted in this duct a throttling device actuated by a movable actuating member and this actuating member is in turn acted upon, against the action of biasing means which tend to displace it in the direction corresponding to the opening of the throttling device, on the one hand by means, preferably hydraulic means, adapted to exert on the said actuating member a force which increases as the speed of the driven member, and on the other hand a semi-positive mechanical connection inserted between the said actuating member and the accelerator of the thermal engine, this connection being only effective in the direction corresponding to an increase of the speed of the said engine.

The annexed drawing diagrammatically illustrates a driving unit for an automotive vehicle according to the present invention.

Referring to the drawing a driving unit for an automotive vehicle comprises an internal combustion engine 1 and a hydraulic power transmission embodying a hydraulic generator or pump 2 driven by the shaft 3 of the said engine, two hydraulic motors 4 and 4a each coupled with a driving wheel 5 or 5a of the vehicle, a delivery line 6 and a return line 7, the said lines forming a closed circuit between hydraulic generator 2 and hydraulic motors 4 and 4a.

As it may be seen in the drawing the hydraulic fluid is supplied in parallel to hydraulic motors 4 and 4a by branch pipes 8 and 8a from the delivery line 6 and the fluid exhausting from the said motors is led to the return line 7 by branch pipes 9 and 9a. The hydraulic fluid normally flows in the direction indicated by the arrows. Leakages may be compensated by fluid from a sump or reservoir 10 which, for the sake of clearness of the drawing, has been illustrated at a number of different positions thereon.

Alternatively the hydraulic motor 4a could be dispensed with, both wheels 5 and 5a being driven by motor 4.

In order to realize a power transmission having a variable speed ratio, the hydraulic generator 2 and/or the hydraulic motors 4 and 4a are so arranged that it may be possible to vary the volume of fluid which they deliver, or which they receive, for each revolution of their driving shaft 3, or of their driven shaft 11 or 11a. Such an arrangement is well-known in the art and need not therefore be described here.

The driver of the vehicle controls the torque developed by the internal combustion engine 1 by means of an accelerator pedal 12 connected, as diagrammatically shown at L, by a rod and lever transmission with the said engine, as for instance with the throttle valve thereof, with the fuel injection pump, etc. This pedal 12 is pivoted at 13 and it should be pushed in the direction shown by the arrow when it is desired to increase the fuel supply to the engine and therefore the torque or speed thereof.

A discharge conduit 14 is arranged between the hydraulic delivery line 6 and the return line 7, being noted that this discharge pipe could also be disposed between line 6 and the compensating reservoir or sump 10. In this pipe is inserted a throttling device 15 which is indirectly connected with an actuating element 16. This actuating element is loaded by a spring 17 which acts in the direction corresponding to the opening of the throttling device 15, and it is submitted to the action of means adapted to develop a force which increases as the speed of the driven member (namely wheels 5 or 5a), and of a semi-positive mechanical connection interposed between the said element 16 and the accelerator pedal 12 (or the lever and rod gearing associated thereto).

This element 16 is conveniently given the form of a rod, the said rod being axially slidable towards the right, as seen in the drawing.

The means used to impart to rod 16 a force which increases as the speed of the driven member 5 or 5a are preferably hydraulic. In the example illustrated they are formed of a pump 18 driven by the shaft 11a of the hydraulic motor 4a, and the delivery pipe 19 of which comprises a calibrated orifice 20. With such an arrangement the fluid pressure within the delivery pipe 19 upstream of the calibrated orifice obviously increases as the speed of wheel 5a. This pressure is transmitted by a branch pipe 19a to a cylinder 21 in which is slidably disposed a piston 22 secured to the end of the aforesaid rod 16.

The semi-positive mechanical connection between rod 16 and pedal 12 is so arranged as only to be effective for the direction which corresponds to an increase of the speed or torque of internal combustion engine 1. For this purpose it may comprises a lever 23 having one end pivoted as at 24, while its other end is pushed by an extension 12a of pedal 12 beyond its pivot 13, lever 23 being further connected with rod 16, as for instance by means of a transverse pin 25 carried by the said rod and of an elongated opening 26 formed in lever 23 to receive slidably the said pin.

Although rod 16 could act directly on the throttling device 15, there is conveniently interposed an intermediate remote-control hydraulic transmission.

As shown in the drawing this transmission preferably comprises a pump 27 the delivery pressure of which is determined by the position of rod 16, this pressure being transmitted to a cylinder 31 in which is slidable a piston 28 carrying a rod 28a which acts as a pusher on the throttling device 15 against the action of a loading spring 29. Pump 27 is conveniently driven by the shaft 3 of internal combustion engine 1 and its delivery pipe 30 is divided into two branches 30a and 30b, the first one being connected with a variable throttling device which is described below and the second one being connected with the cylinder 31 in which the above mentioned piston 28 is slidably mounted. The throttling device provided on the first branch 30a may comprise a stationary seat 32 and a piston-like movable valve 33 on which the aforesaid rod 16 acts through the medium of a spring 34 in the direction corresponding to the closing of the fluid passage, said valve 33 being urged in the direction corresponding to the opening of the fluid passage by the fluid pressure within branch pipe 30a.

The throttling device 15 may also comprise an axially slidable piston-like valve member (which has been referenced 15) adapted to cooperate with a stationary valve seat 35 inserted between two successive sections of the discharge conduit 14. The above described pump 27 may be used as the filling pump of the hydraulic circuit of the transmission by connecting its delivery side with the main lines 6 and 7 by means of auxiliary branch pipes very diagrammatically indicated at 30c and 30d.

The driving unit described operates as follows:

The vehicle being at standstill, the internal combustion engine is running idle at slow speed together with the hydraulic generator 2 and the hydraulic pump 27, while pump 18 is at rest. The actuating rod 16 is maintained at the position illustrated by its loading spring 17 since the extension 12a of the accelerator pedal 12 does not act on lever 23 and since no fluid pressure acts on the piston 22. Valve member 33 is therefore at the open position. Since the fluid discharged by the pump 27 may thus flow freely through the throttling device 32–33, the pressure acting on the piston 28 which controls valve member 15 is substantially zero. The discharge conduit 14 therefore acts as a by-pass for the fluid delivered by generator 2, the said fluid only having to raise the piston-like valve member 15 against the action of its relatively light spring 29. The torque developed by the hydraulic motors 4 and 4a is also substantially null.

When the vehicle is to be started, the driver acts on the accelerator pedal 12 in the direction of the arrow. The actuating rod 16 is therefore progressively moved towards the right as seen in the drawing and the intermediate spring 34 is progressively compressed. The hydraulic fluid delivered by pump 27 is more and more throttled between valve member 33 and its seat 32, pressure rises in cylinder 31 and piston 28 moves towards the right, thus progressively closing valve member 15 against the action of the light spring 29.

The fluid delivered by the hydraulic generator 2 is less and less by-passed through the discharge conduit 14 and pressure rises within the delivery line 6. The torque of hydraulic motors 4 and 4a also increases until it is high enough to start the vehicle.

Under normal running conditions the valve member 15 is fully closed and the discharge conduit 14 is therefore ineffective to by-pass fluid.

When the vehicle is running downhill, the driver will generally release the accelerator pedal 12. This return movement of pedal 12 will have no influence on rod 16, since the connection realized by lever 23 is semi-positive and is ineffective in that direction. But owing to the vehicle speed the pressure of the fluid delivered by pump 18 within pipe 19 upstream of the calibrated orifice 20 is sufficient to maintain piston 22 against the action of its returning spring 17. Valve member 33 therefore remains at the closed position together with valve member 15. Engine 1 acts as a brake for the vehicle.

But if, when the accelerator pedal 12 is raised, the vehicle slows down, the delivery pressure of pump 18 decreases, valve member 33 opens progressively, the pressure acting on piston 28 decreases and valve member 15 in turn opens almost instantaneously, whereby the discharge conduit 14 is again effective to by-pass fluid. The engine may therefore rotate idle even when the vehicle comes to a standstill.

It is therefore apparent that with the driving unit described the driver may at will connect or disconnect the engine with respect to the wheels by only actuating the accelerator pedal, and that nevertheless the engine will act as a brake in a declivity.

We claim:

1. A driving unit comprising a thermal engine; a control member acting on said engine to vary the power thereof, said control member being displaceable between a low power position and a high power position; a main hydraulic pump driven by said thermal engine to deliver a hydraulic fluid under pressure, said pump having a delivery side and an inlet side; a hydraulic motor driven by hydraulic fluid under pressure from the delivery side of said main hydraulic pump; a member driven by said hydraulic motor; a hydraulic fluid discharge conduit extending between the delivery side of said main hydraulic pump and the inlet side thereof; a valve device inserted in said hydraulic fluid discharge conduit to stop fluid passage therethrough; first means acting on said valve device to urge same towards an open position; second means acting on said valve device to close same against the action of said first means with a force increasing as the speed of said driven member; and third means acting on said valve device to close same against the action of said first means with a force which increases when said control member is displaced from its low power position towards its high power position.

2. In a driving unit as claimed in claim 1, said third means being in the form of a semi-positive connection between said control member and said valve device, said connection being only effective when said control member is displaced in the direction corresponding to an increase of the power of said engine.

3. In a driving unit as claimed in claim 1, said second means being hydraulic and embodying an auxiliary hydraulic pump driven by said hydraulic motor to deliver a flow of hydraulic fluid, and a calibrated orifice inserted in the path of said flow to produce upstream of said orifice a pressure increasing as the speed of said hydraulic motor.

4. In a driving unit as claimed in claim 1, said valve device being under control of an actuating member; and said second and third means acting on said valve device through the medium of said actuating member.

5. In a driving unit as claimed in claim 1, said valve device comprising a piston-like movable member and a seat on which said member may be applied to close fluid passage; and said first means being in the form of a spring biasing said movable member towards the open position.

6. A driving unit comprising a thermal engine; a control member acting on said engine to vary the power thereof, said control member being displaceable between a low power position and a high power position; a main hydraulic pump driven by said thermal engine to deliver a hydraulic fluid under pressure, said pump having a delivery side and an inlet side; a hydraulic motor driven by hydraulic fluid under pressure from the delivery side of said main hydraulic pump; a member driven by said hydraulic motor; a hydraulic fluid discharge conduit extending between the delivery side of said main hydraulic pump and the inlet side thereof; a valve device inserted in said hydraulic fluid discharge conduit to stop fluid passage therethrough; an actuating member to control said valve device; first means urging said actuating member towards a position thereof which corresponds to the opening of said valve device; second means acting on said actuating member to displace same against the action of said first means to close said valve device, with a force which increases as the speed of said driven member; and third means acting on said actuating member to displace same against the action of said first means to close said valve device, with a force which increases when said control member is displaced from its low power position to its high power position.

7. In a driving unit as claimed in claim 6, said second means being hydraulic.

8. In a driving unit as claimed in claim 6, said second means comprising an auxiliary pump driven by said hydraulic motor to deliver hydraulic fluid under pressure; throttling means interposed on the flow of hydraulic fluid from said auxiliary pump to produce upstream of said throttling means a counterpressure which increases as the speed of said hydraulic motor; and a cylinder and piston assembly actuated by said counterpressure and acting in turn on said actuating member.

9. In a driving unit as claimed in claim 6, said third means being in the form of a semi-positive connection between said control member and said actuating member, said connection being only effective when said actuating member is displaced in the direction corresponding to an increase of the power of said engine.

10. In a driving unit as claimed in claim 6, said actuating member controlling said valve device hydraulically.

11. A driving unit comprising a thermal engine; a control member acting on said engine to vary the power thereof, said control member being movable between a low power position and a high power position; a main hydraulic pump driven by said thermal engine to deliver a hydraulic fluid under pressure, said main pump having a delivery side and an inlet side; a hydraulic motor driven by hydraulic fluid under pressure from the delivery side of said main hydraulic pump; a member driven by said hydraulic motor; a hydraulic fluid discharge conduit extending between the delivery side of said main hydraulic pump and the inlet side thereof; a main valve device inserted in said hydraulic fluid discharge conduit to stop fluid passage therethrough; first biasing means to urge said main valve device towards an open position; a main hydraulic ram to close said main valve device against said first biasing means; a first auxiliary hydraulic pump driven by said thermal engine to deliver hydraulic fluid under pressure to said main hydraulic ram; an auxiliary valve device to by-pass hydraulic fluid from said first auxiliary pump and to thereby render said first auxiliary pump ineffective; second biasing means to urge said auxiliary valve device to the open position at which said first auxiliary pump is ineffective; a movable actuating member to close said auxiliary valve device against the action of said second biasing means; an auxiliary hydraulic ram to displace said movable actuating member to close said auxiliary valve device; a second auxiliary pump driven by said hydraulic motor to deliver hydraulic fluid under pressure to said auxiliary hydraulic ram to cause same to close said auxiliary valve device; a throttling device to by-pass hydraulic fluid from said second auxiliary pump so as to render said second auxiliary pump ineffective to actuate said auxiliary ram when the speed of said driven member is below a predetermined limit; and a semi-positive mechanical connection between said control member and said actuating member to cause same to close said auxiliary valve device, said connection being only effective when said control member is displaced towards its high power position.

12. In a driving unit as claimed in claim 11, said actuating member acting on said auxiliary valve device through the medium of spring means.

13. In a driving unit as claimed in claim 11, said main valve device comprising a valve body having an inlet, an outlet and a seat interposed between said inlet and said outlet; and a piston-like movable valve member to co-act with said seat, said valve member being submitted to the pressure of the hydraulic fluid from the delivery side of said main hydraulic pump.

14. In a driving unit as claimed in claim 11, said auxiliary valve device comprising a valve body having an inlet, an outlet and a seat interposed between said inlet and said outlet; and a piston-like movable valve member to co-act with said seat, said valve member being submitted to the pressure of the hydraulic fluid from said second auxiliary hydraulic pump.

References Cited in the file of this patent
UNITED STATES PATENTS 2,972,224    Forster _____ Feb. 21, 1961
3,093,946    Pitt et al. _____ June 18, 1963